United States Patent [19]

Selby et al.

[11] Patent Number: 5,367,135

[45] Date of Patent: Nov. 22, 1994

[54] PUSH BUTTON CONSTRUCTION FOR PLAYER CONTROL

[75] Inventors: Steven F. Selby; Dewayne E. Green, Winchester, Tenn.; Edward C. Sarkisian, both of Huntsville, Ala.; Sigmund Klueger, Huntsville, Ala.

[73] Assignee: Chrysler Corporation, Highland Park, Mich.

[21] Appl. No.: 140,994

[22] Filed: Oct. 26, 1993

[51] Int. Cl.⁵ ............................................. H01H 13/70
[52] U.S. Cl. .................................. 200/345; 200/344; 200/341
[58] Field of Search ............... 200/345, 344, 341, 520, 200/295, 337, 338

[56] References Cited

U.S. PATENT DOCUMENTS

| 2,884,503 | 4/1959 | Connelly | 200/345 |
| 3,681,556 | 8/1972 | Osika | 200/295 |
| 4,920,243 | 4/1990 | Yuge | 200/341 |

OTHER PUBLICATIONS

*Troubleshooting and Repairing Audio & Video Cassette Players & Recorders,* Homer L. Davidson, pp. 7-32, 7-33. 1992.

Primary Examiner—Henry J. Recla
Assistant Examiner—David J. Walczak
Attorney, Agent, or Firm—Edward A. Craig

[57] ABSTRACT

Spring-clips are pressed into push buttons to provide a stabilized and yieldable fit on the ends of cassette player control levers. This allows freedom of button movement, if needed, to enhance the assembly of the escutcheon-lens assembly to the cassette player-chassis assembly. Because of the great accumulation of tolerances between the escutcheon-lens assembly and the cassette player-chassis, the spring clips provide sufficient freedom of movement of the buttons relative to the levers, as needed, to improve the alignment of the buttons with corresponding openings in the escutcheon-lens assembly. Once the escutcheon-lens assembly is secured to the player-chassis assembly. This invention eliminates or reduces button rattle while imparting a firm feeling to the activation action of the button.

2 Claims, 3 Drawing Sheets

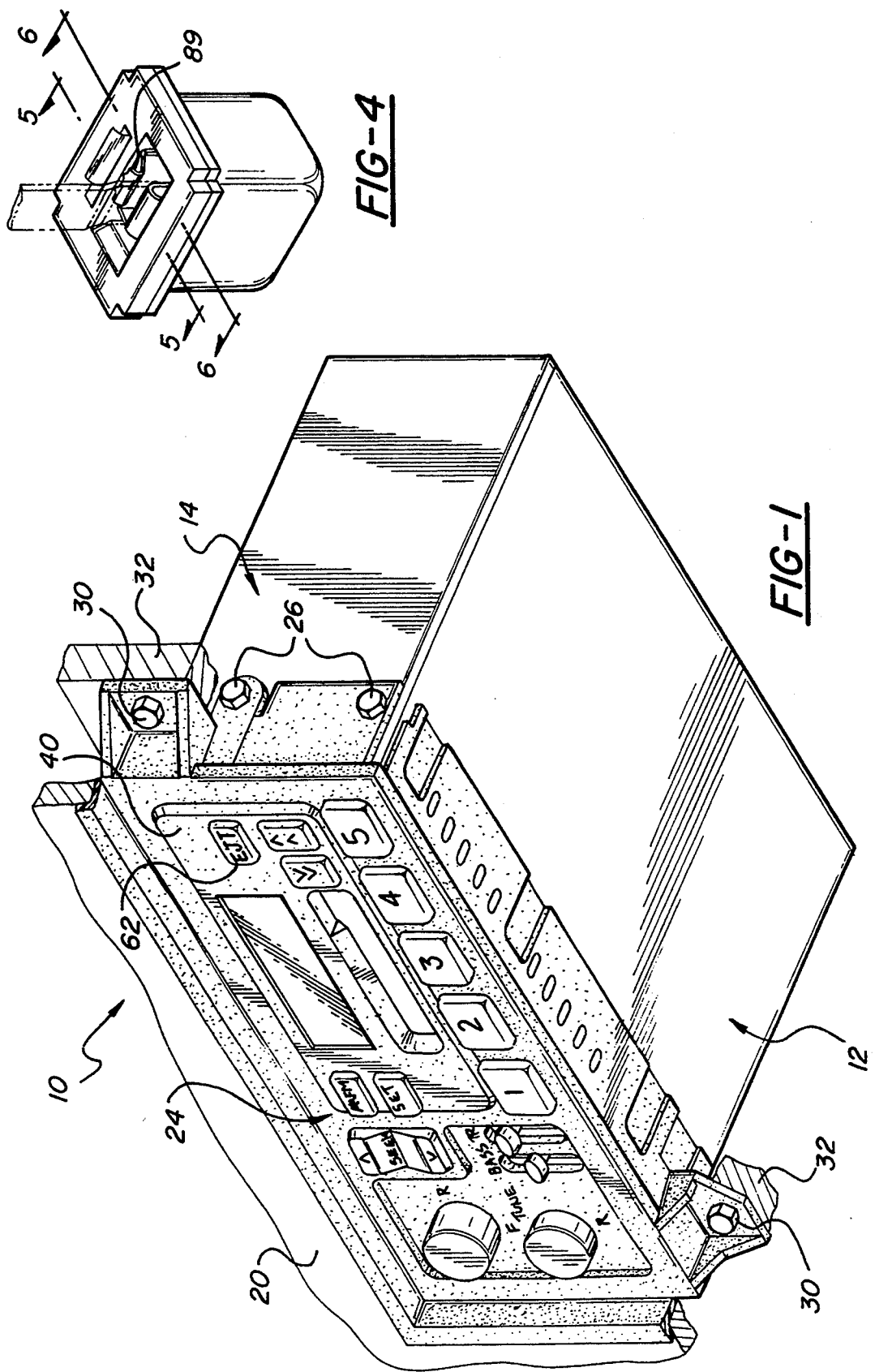

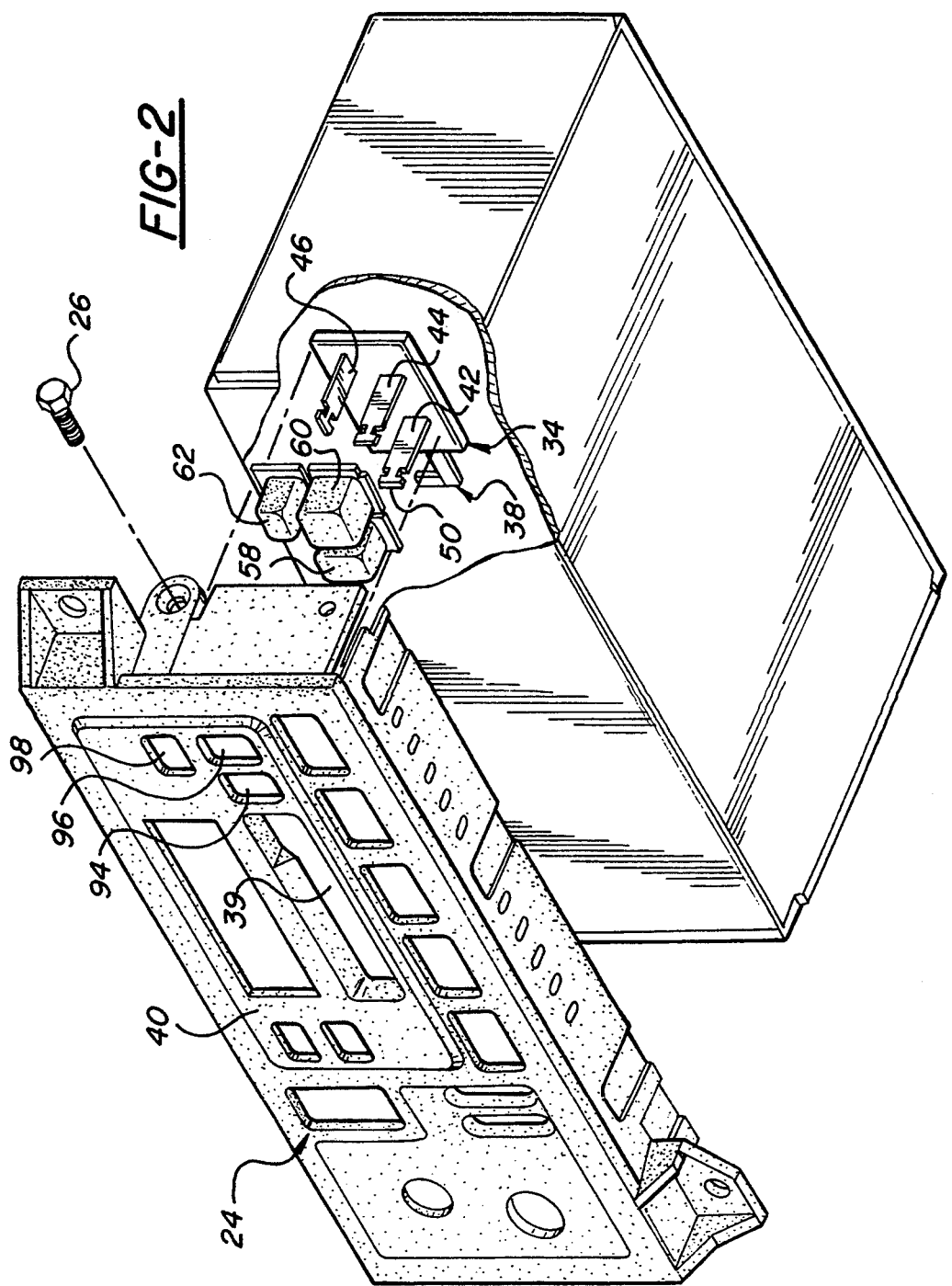

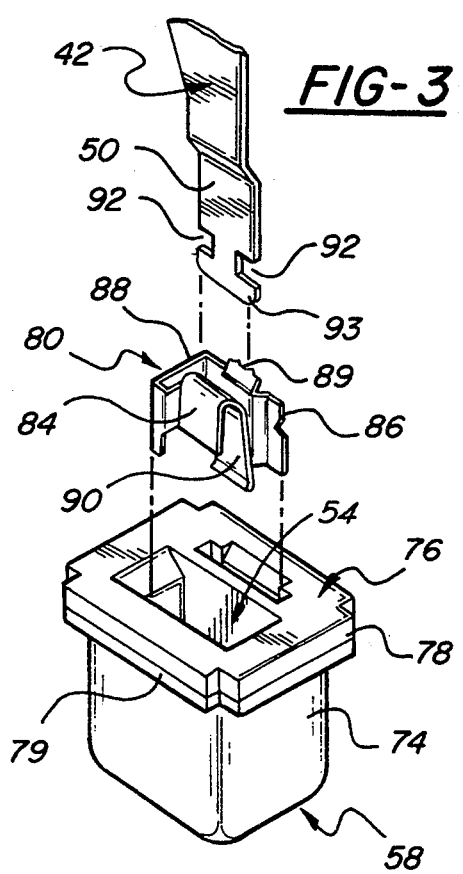
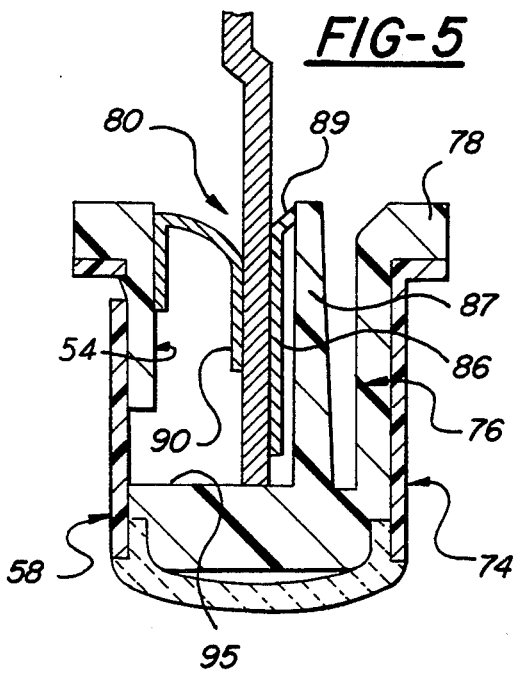
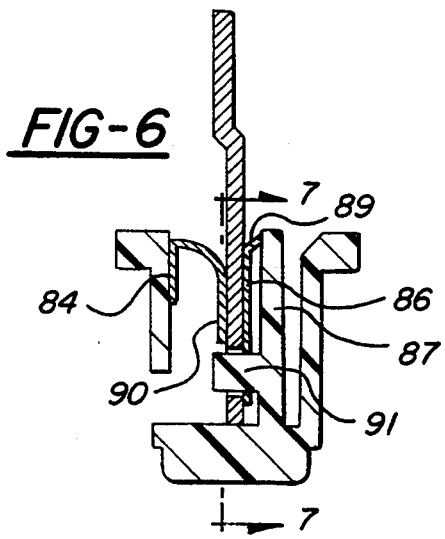
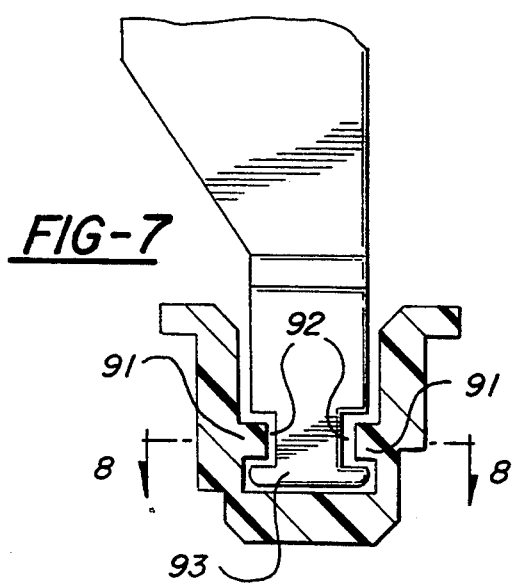
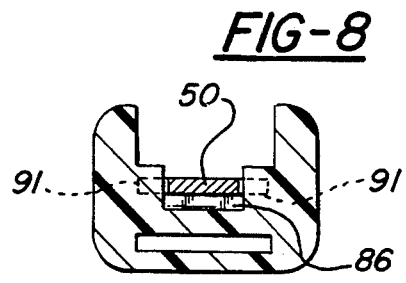

PUSH BUTTON CONSTRUCTION FOR PLAYER CONTROL

BACKGROUND OF THE INVENTION

This invention relates to controls for cassette players and similar units, and more particularly, to new and improved connections of the control push buttons to associated control levers for enhancing assembly of the escutcheon-lens assembly to the front of the player and providing effective vibration damping of the push button relative to the associated control lever as well as a firm feeling of the button when it is manually depressed.

DESCRIPTION OF RELATED ART

Various cassette players, often combined with AM-FM Radios in compact units, have utilized manual push buttons that are mounted on the ends of control levers which extend outwardly of the chassis of the cassette players. These control levers are operatively mounted in predetermined positions in the player and are engineered so that the button-capped levers project therefrom in a pattern through openings in a finishing face plate, such as an escutcheon-lens assembly. Generally, these levers are manually moved inward by depressing the associated button to operate associated control systems to control cassette player operation. For example, a first lever may be displaced to operate linkage which effects fast-forward of the cassette tape so that the user can select particular forward portions of the tape and listen to particular selected music or information recorded on the cassette tape. A second lever can be displaced to operate linkage to rewind the cassette tape for repeat tape play while a third can be use to stop tape play and to eject the cassette. These, and other control levers and functions, are well known in the art and elaboration thereon is accordingly not necessary.

To provide a finely finished appearance and additional detail regarding player and radio operation, an escutcheon-lens assembly or face plate is affixed to the chassis assembly supporting the player-radio unit. Such escutcheon-lens assemblies have lenses positioned and secured to the escutcheon within a predetermined tolerance range and are generally provided with spaced openings therethrough that are designed to align with and accommodate the associated push buttons and the end portions of the levers so that the escutcheon-lens assembly can be installed as a finishing face on the player and connected by threaded fasteners to the chassis therefor.

In installations, such as in vehicles, the player chassis assembly with the escutcheon-lens assembly secured thereto is fastened to support structure associated with the instrument panel of the vehicle.

In view of the fact that a wide tolerance range between the escutcheon-lens assembly and the player-chassis assembly is allowed for the quick and economical assembly of such components for vehicles, the push buttons have been loosely mounted on the ends of the levers extending from the player as installed in the chassis assembly so that they can be moved, aligned and inserted in the openings therefor in the escutcheon-lens assembly. While such loose button mounting provided improved assembly of the escutcheon-lens assembly to the chassis, difficulties arose because of the tendency of the push buttons to tilt or fall off the ends of the levers after initial installation thereon, and prior to or during the installation of the finishing escutcheon-lens assembly. Buttons falling off were often scrapped because of marring or breakage. Button tilting caused their misalignment with the button openings in the escutcheon-lens assembly and often involved tedious manual manipulation and re-positioning of the buttons as they were inserted into the associated openings in the escutcheon-lens assembly before the escutcheon-lens assembly could be attached to the chassis assembly.

SUMMARY OF THE INVENTION

In the present invention, special spring clips of resilient sheet material are installed in the inner openings or cavities of the push button assembly so that opposing leg portions of the clip receive portions of the end of the standardized and associated lever therebetween to position and yieldably hold the push button thereon. In this stabilized push button position, the escutcheon-lens assembly can usually be installed on the chassis assembly since the buttons align with their openings in the escutcheon-lens assembly. However, in the case of misalignment because of limit stack or tolerance each push button has a limited range of movement or adjustment relative its associated lever so that the buttons can be positioned to align with the button openings in the escutcheon-lens assembly. Accordingly, with this arrangement, the escutcheon-lens assembly can be easily installed on the player chassis and usually without any particular efforts to align the push buttons with the button openings in the escutcheon-lens assembly.

With this invention, there is also improved connection of the push button with its associated control lever to dampen vibrations that may occur between the push buttons and their levers, particularly when used in vehicles that pass over rough roadways so that rattle and wear between the levers and associated push buttons are reduced or eliminated.

The spring clip and push lever attachment also provides a firm feeling of the button by the operator while the button is being manually moved for player control since the looseness or rocking between these parts occurring in the prior construction has been eliminated.

The present invention can be utilized with standardized push buttons to effect their modification without material cost penalty while eliminating lost and broken buttons and providing additional savings in assembly and providing longer service life.

These and other features, objects and advantages will become more apparent from the drawings and detailed description.

DESCRIPTION OF THE DRAWINGS

FIG. 1 is a pictorial view with parts broken away of a radio and cassette player installed in the instrument panel of an automotive vehicle;

FIG. 2 is an exploded view of the radio and tape player of FIG. 1 with certain control and other details omitted;

FIG. 3 is an exploded pictorial view of a push button assembly, a cassette operating lever and a lever spring retention clip;

FIG. 4 is a pictorial view of the push button and lever spring retention clip assembly installed on a control lever;

FIG. 5 is a cross-sectional view taken generally along lines 5—5 of FIG. 4;

FIG. 6 is a cross-section view similar to FIG. 5 but taken generally along lines 6—6 of FIG. 4;

FIG. 7 is a sectional view with spring components removed taken generally along lines 7—7 of FIG. 6; and FIG. 8 is a cross-sectional view taken generally along lines 8—8 of FIG. 7.

DETAILED DESCRIPTION OF THE DRAWINGS

Turning now in greater detail to the drawing, there is shown in FIG. 1 a radio and tape cassette player unit 10 comprising a radio and tape player 12 mounted in a chassis 14 which, in an automotive application, is installed as an assembly into an accommodating opening in the instrument panel 20. The unit 10 has a frontal escutcheon-lens assembly 24 secured by threaded fasteners 26 to the chassis 14 and by threaded fasteners 30 to support structure 32 also behind the instrument panel.

An illustrative number of the radio and cassette player components are shown in the exploded view of FIG. 2 including a portion of a cam and actuator system 34 for controlling the tape player, such as lever system 38 for controlling fast forward of the tape of a cassette inserted through outer door 39 in the lens 40 of the escutcheon-lens assembly 24.

The cam and actuator system 34 is manually controlled by a plurality of elongated push levers 42, 44, 46 which extend outwardly from operative connection therewith and terminate in forward end portions, such as end portion 50 of push lever 42, for reception within the inboard cavity 54 formed in push button assembly 58. The other push levers have end portions which are like the end of lever 42 and extend into cavities in corresponding push button assemblies 60 and 62.

Each of the button assemblies has a hat-like outer plastic casing 74 which is hollowed to receive an optic or insert 76 of light-transmitting plastics material which has outer walls to fit against the inner walls defining the cavity of the casing. The insert also has a peripheral flange 78 that fits onto and matches the flange 79 of the outer casing. Light from a source, not shown, is transmitted through the optic and through cuts or reliefs in the outer face of the casing 74 so that the user may be informed of button function, such as the Fast Forward symbol on button 58.

A generally U-shaped spring clip 80 stamped or otherwise formed from resilient sheet metal blank material is employed to maintain the push button assemblies in a stabilized position on the ends of the associated operating levers while allowing them to be tilted or otherwise adjusted, as needed, on the associated lever to enhance the efficient assembly of the finishing escutcheon-lens assembly onto the radio and cassette player.

More particularly, the spring clip 80 has outboard side arms 84 and 86 which are connected together by an end wall 88 to define the general U-shaped configuration in top view. Joined to the top of side arm 84 is a reversely bent spring arm 90 which extends downward in a spaced relationship to the side arm 84 as well as with arm 86.

The side arm 86 has a bent-over tab 89 at the upper end thereof which has retainer teeth that bite into an inner wall of the plastics insert, or optic 76, to hold the spring clip therein, and space arm 86 from the adjacent intermediate wall 87 of insert 76. The side arm 86 is then free to cooperate with the facing spring arm 90 to define a spring opening which accommodates the end of the lever 42. As shown in FIG. 5, this construction, in effect, provides a resilient connection to yieldably hold the button assembly in a stabilized position on the free end of the lever 42.

FIGS. 5, 6, 7 and 8 show details of one preferred construction of optic 76. This construction of the optic has opposing free-end retainer sections or tabs 91 extending from opposing side walls thereof, and spaced from the end wall 95 of the optic to form a bight that fits with clearance into opposing recesses 92 formed in the end portion 50 of the lever 42 defining an enlarged head 93.

With this construction, the button can be tilted, or otherwise manipulated, relative to the end portion 50 of its associated lever so that the spring arm 90 can be deflected to one side. This allows the enlarged head 93 of the lever to be trapped beneath the tabs 91, as best shown in FIGS. 6 and 7. The return force of the spring arm 90 positions the button assembly in an aligned position on the end of the push lever and positions the head 93 closely adjacent the inner surface of the optic. With this arrangement the push button, when pushed, will linearly transmit manual apply force through the optic tabs 91 and in some instances through the lower surface of the head 93 to the lever 42 to effect displacement of the lever 42.

For installation, the push buttons 58, 60 and 62 are easily mounted on the outer ends of the levers 42, 44 and 46 with the spring arms securely but yieldably positioning the button assemblies onto their associated levers. If necessary, the buttons can be moved to adjusted positions so that the openings 94, 96, 98 in the lens 40 of the eschutcheon-lens assembly align therewith. The eschutcheon-lens assembly can then be installed into the front of the radio cassette player with the buttons extending through openings 94, 96, 98 and secured by threaded fasteners 26.

As shown in FIG. 1, the button assemblies extend through their opening 94, 96, 98 and are trapped behind the lens-eschutcheon assembly when it is secured to the chassis by fasteners 26. The yieldable spring clip holds the button so that any tendency of the button and lever to vibrate relative to one another is reduced thereby reducing noise generation between these two components and maximizing service life. The button assemblies being affixed by the spring clips to their levers eliminate rocking or looseness therebetween so that there is a firm feeling when the button is manually depressed for displacing the associated lever for changing tape player operations.

While a preferred embodiment of the invention has been shown and described, other embodiments will now become apparent to those skilled in the art. Accordingly, this invention is not to be limited to that which is shown and described by the following claims.

What is claimed is:

1. A spring construction for yieldably connecting a manually movable push button to a push button lever wherein said lever is operatively connected to a player unit and said push button has a cavity formed therein and wherein a finishing panel with push button openings therein is adapted to be fixed to said unit;

the improvement comprising a unitized three arm clip operatively mounted in said cavity, said clip having two side arm portions connected by an end wall and a spring arm portion connected to one of said side arm portions and located intermediate said side arm portions and extending in side by side relationship to said side arm portions;

said spring arm portion cooperating with another of said side arm portions to define an opening therebetween extending a substantial distance along oppositely facing sides of said spring arm portion and said other side arm portion to receive the end of said lever, said spring arm portion and said One side arm portion being adapted to deflect to yieldably hold a button in a stabilized position on the end of said lever while permitting said push button to move with respect to said lever in order to enable said push button to be inserted into an opening therefor in the finishing panel structure for said player unit.

2. The spring clip defined in claim 1,
wherein said one side arm portion has a bent-over tab that is adapted to engage said button to hold said one side arm portion in spaced relationship thereto and said tab has retainer teeth adapted to bite into said button to hold said clip thereto.

* * * * *